United States Patent [19]

Fallon et al.

[11] 4,349,136

[45] Sep. 14, 1982

[54] SAFETY PRESSURE REDUCING REGULATOR

[75] Inventors: Merton R. Fallon, Thousand Oaks, Calif.; Thomas W. Clements, Ambler, Pa.

[73] Assignee: Draft Systems, Inc., Northridge, Calif.

[21] Appl. No.: 119,561

[22] Filed: Feb. 7, 1980

[51] Int. Cl.³ .............................................. B67D 1/12
[52] U.S. Cl. .................................. 222/396; 137/467; 137/505.12; 222/400.7
[58] Field of Search ............ 137/467, 540, 854, 116.3, 137/505.11, 505.12, 505.25, 505.26, 505.38–505.43; 222/396, 397, 400.7

[56] References Cited

U.S. PATENT DOCUMENTS

| | | | |
|---|---|---|---|
| 2,770,252 | 11/1956 | Bass | 137/505.12 |
| 3,250,288 | 5/1966 | Hammon | 137/116.3 |
| 3,443,583 | 5/1969 | Webb | 137/505.12 |
| 3,548,862 | 12/1970 | Nakamura | 137/505.12 X |
| 3,556,125 | 1/1971 | Morden | 137/116.3 |
| 3,665,956 | 5/1972 | Hammon | 137/505.11 |
| 4,171,004 | 10/1979 | Cerrato et al. | 137/505.11 X |

*Primary Examiner*—F. J. Bartuska
*Attorney, Agent, or Firm*—James E. Brunton

[57] ABSTRACT

A safety pressure reducing regulator for use in systems operable by pressurized gas incorporates multiple safety features which preclude excessive pressure buildup in the system and provide protection against catastrophic failures. The regulator includes primary and secondary regulator stages through which pressurized gas from a gas pressure source is supplied to a pressure control chamber which provides the operating pressure for the system. The primary regulator stage is designed to reduce the inlet gas pressure to an intermediate level. The secondary regulator stage is designed to automatically regulate the supply of the pressurized gas at the intermediate pressure to the pressure control chamber to maintain a desired operating pressure therein. A flexible diaphragm is normally disposed across the pressure control chamber which is adapted to function as a check valve to control communication between the secondary regulator stage and the pressure control chamber. A clamping piston provided with a central passage normally clamps the flexible diaphragm in place across the pressure control chamber. In the event of excess pressure buildup in the pressure control chamber, the piston unclamps the diaphragm which collapses into its central passage to permit the pressurized gas to escape through exhaust vents.

35 Claims, 4 Drawing Figures

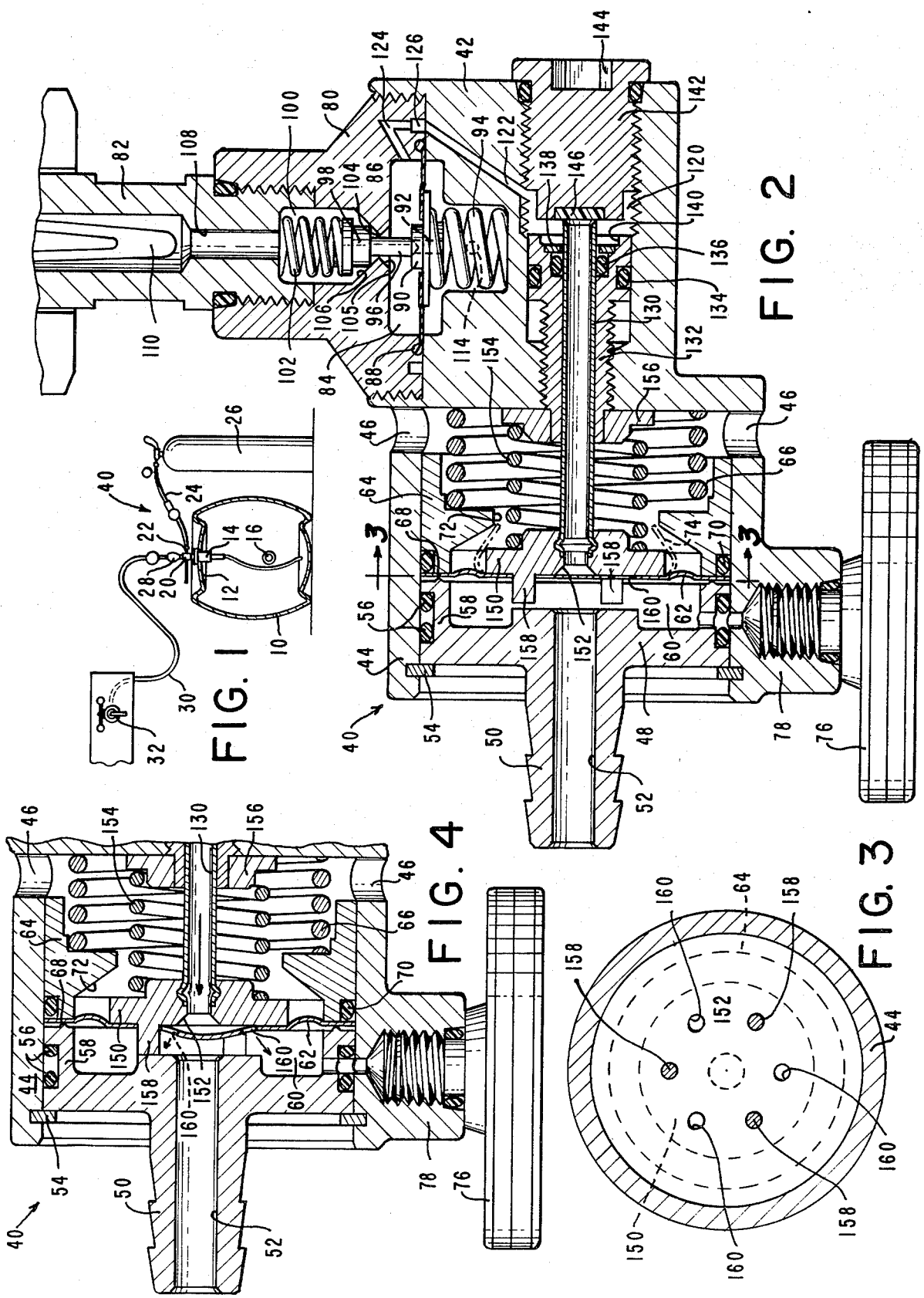

SAFETY PRESSURE REDUCING REGULATOR

BACKGROUND OF THE INVENTION

The present invention relates to a pressure reducing regulator for use in systems operable by pressurized gas, and, more particularly, to a safety pressure reducing and regulating device which maintains a desired operating pressure in the system and provides protection against catastrophic failures.

The present invention provides a safety pressure reducing regulator for use with beverage dispensing equipment utilizing a pressurized gas source which reduces the gas pressure of the source to a desired level for dispensing operations and provides safeguards against possible injury and death in the event of failure of the pressure regulator. The present invention achieves a fail-safe pressure reducing regulator suitable for use with pressure sources containing high pressure compressed gases or highly compressed liquids which gasify at the time of pressure reduction.

Typically, in a dispensing system for drawing liquids, such as beer or soda, from containers, such as beer kegs or barrels, a source of pressurized gas is employed to pressurize the liquid contents of the container. The gas pressure source is usually coupled to the container via a pressure regulator which is intended to reduce the high gas pressure from the source to a suitable pressure level for operation of the dispensing system. For example, U.S. Pat. No. 3,848,631, assigned to the common assignee herewith, discloses a pressure regulator which provides protection against over pressurization of the container beyond safe limits. Other types of pressure regulating devices are disclosed in U.S. Pat. Nos. 2,195,728; 2,642,701; 2,770,252; 2,816,561; 2,891,569; and 3,088,486. U.S. Pat. No. 3,190,496 shows a diaphragm meter valve.

Generally, the prior art devices have been susceptible to failure in operation and have not provided complete protection against over-pressurization which frequently results in serious injury or death to persons in the immediate area when an explosion occurs. Some of the current devices employed perform the desired pressure reduction and regulation in a single stage which leads to extremely dangerous situations when the devices fail. In addition, the current devices generally do not employ adequate reverse flow check valves or systems to preclude the contamination of the regulator mechanism by reverse flow of gas or liquid through the device at the time it is disconnected from the pressure source. Moreover, the devices generally allow free interchange of various gauges, shut-off valves, pressure hoses and other types of fittings at the various high pressure and low pressure ports of the devices. Thus, it is possible for mistakes to occur in the installation of such devices with accompanying malfunctions and dangers.

Safety is a major concern in the installation and operation of pressure reducing and regulating devices. Avoidance of catastrophic failures is absolutely essential because such failures can result in serious personal injury and even death of persons in the immediate area of the equipment. Experience has shown that nearly all catastrophic failures of pressure regulating devices in the prior art are the result of contamination, or the absence or malfunction of reverse flow check valves in the equipment. The devices are also susceptible to malfunctions resulting from tampering by inexperienced or unqualified personnel with the intended operation of the devices. In addition, failures due to normal wear can become catastrophic because of the inadequate safety considerations in the design of the equipment.

SUMMARY OF THE INVENTION

The present invention achieves a pressure regulator device which is characterized by enhanced safety features over the prior art. The device is designed to achieve pressure reduction in two separate stages and to accurately maintain a desired operating pressure at its outlet. The pressure regulator is also adapted to provide effective protection against over-pressurization to preclude catastrophic failures. This protection is achieved by use of a collapsible diaphragm which normally serves as a seal for a pressure control chamber in the regulator device and is adapted to collapse in response to excess pressure and release the pressurized gas harmlessly through exhaust vents. The two-stage pressure reduction is accomplished by a primary regulator stage which receives pressurized gas from the source and reduces the gas pressure to an intermediate level and a secondary regulator stage which is adapted to selectively provide communication between the primary regulator stage and the pressure control chamber to maintain a desired gas pressure in the control chamber which is supplied to a dispensing system. The secondary regulator stage is adjustable to selectively vary the outlet pressure in the pressure control chamber. The flexible diaphragm is normally clamped across the pressure control chamber by a slidable piston which engages the diaphragm at its periphery. In response to excess pressure in the pressure control chamber, the piston is moved out of clamping engagement with the diaphragm to allow the diaphragm to collapse and release the pressurized gas through the exhaust vents. The piston includes a central passage through which the pressurized gas escapes from the pressure control chamber through the exhaust vents provided in the regulator housing.

A preferred embodiment of the pressure regulator is principally designed for use with high pressure gas sources which are used to dispense carbonated beverages, e.g., beer or soda. The gas pressure source normally contains liquid carbon dioxide, which exists at a pressure dependent upon its storage temperature, but is normally between 800 and 1000 pounds per square inch (psi). Generally, no carbonated beverages are ever dispensed at pressures in excess of 100 psi. Typically, beer is dispensed at a pressure of 15 psi and carbonated soda at a pressure between 80 and 90 psi. A conventional beer keg is normally designed to withstand internal pressure between 140 and 150 psi.

The pressure regulator of the present invention advantageously employs a primary regulator stage which is nonadjustable and provides a limit on the inlet pressure of 110 psi. This nonadjustable feature precludes tampering with the pressure regulator and precludes application of higher input pressures to the dispensing system. The pressure regulator incorporates a secondary regulator stage which further reduces the gas pressure to the range actually required to dispense beverages. The desired range falls within 12–20 psi for beer and between 12–100 psi for nonalcoholic beverages and carbonated soda. The secondary regulator stage is similar in design to the pressure control mechanism disclosed in U.S. Pat. No. 3,848,631. This pressure control mechanism has the advantage that it is normally closed by the pressure in the beverage container. Thus, any failure which might possibly occur, would usually happen with the secondary regulator stage closed. However, in the event that failure occurs with the secondary regulator stage in its open condition, its pressure control mechanism is designed to freeze itself shut almost instantaneously. Further safety is provided by the collapsible diaphragm in the pressure control chamber which collapses in response to excess pressure and rapidly releases the pressurized gas from the pressure control chamber through the exhaust vents.

The pressure regulator incorporates another extremely important safety feature in the adjustment mechanism employed for the secondary regulator stage. The adjustment mechanism requires that the gas pressure source be shut off and that the pressure regulator be partially disassembled to gain access to the adjustment mechanism. This requirement precludes the danger which arises in prior art systems when the pressure from the source diminishes as the pressurized gas is depleted therefrom. Typically, in the operation of prior art systems, the readily available pressure adjustment on the gas pressure source is turned up until all of the available gas pressure is completely exhausted. Thus, with inexperienced operators, this type of operation results in the pressure regulator in its fully open or maximum pressure condition when the gas pressure source is exhausted. At this time, the inexperienced operator usually discovers that the pressurized gas has been depleted and removes the fully open pressure regulator from the depleted gas source and reinstalls it at its maximum pressure setting on a replacement source which is fully pressurized. If the fully pressurized source is opened without changing the maximum pressure setting of the regulator, a catastrophically dangerous situation arises when the maximum pressure is applied to the beverage container. Frequent fatalities have resulted in situations where this precise sequence of steps was followed. This danger is completely precluded by the pressure regulator of this invention because adjustment of the pressure regulator can only be made by trained personnel equipped with special tools to make the necessary adjustment.

The present invention provides a novel and improved pressure regulator for use in beverage dispensing systems which overcomes or minimizes the problems associated with the prior art devices as set forth above and provides a pressure regulator device which (1) precludes over-pressurization of the beverage container or vessel, (2) incorporates a two-stage pressure reducing system to safely reduce the high gas pressure from the source to the desired operating pressure for the vessel, (3) automatically regulates the pressure in the vessel to maintain the desired pressure therein regardless of the level of pressure supplied to the regulator, (4) precludes undesirable reverse flow of pressurized fluid, either gas or liquid, contents from the beverage container through the pressure regulator, and (5) precludes excess pressure buildup in the beverage container by allowing any excess pressure to rapidly escape through exhaust vents.

In accordance with the invention, a pressure regulator for disposition between a gas pressure source and a pressure vessel comprises a housing provided with a pressure chamber therein and one or more vents to release excess pressure from the pressure chamber, inlet means for supplying pressurized gas from the gas pressure source to the pressure chamber, outlet means in communication with the pressure chamber for supplying the pressurized gas to the pressure vessel, a flexible diaphragm disposed within the housing for normally sealing the pressure chamber from communication with the vents, and clamping means disposed within the housing and adapted to normally clamp the diaphragm across the pressure chamber to block communication with the vents, the clamping means being actuatable in response to excess pressure in the pressure chamber to unclamp the diaphragm and allow the diaphragm to collapse and permit gas to escape from the pressure chamber through the vents. Preferably, the clamping means is embodied as a clamping piston slidably disposed within the housing and provided with a central passage in communication with the vents, the piston being adapted to clamp the diaphragm at its periphery and retain the diaphragm in place over the central passage to preclude gas flow therethrough, and bias means for normally urging the piston into clamping engagement with the diaphragm, the piston being movable against the action of the bias means upon an increase of the gas pressure in the pressure chamber above a predetermined level to unclamp the diaphragm and allow the diaphragm to collapse into the central passage to permit the gas to escape from the pressure chamber through the vents.

A preferred embodiment of the pressure regulator includes a primary regulator stage for receiving pressurized gas from the gas pressure source and reducing the gas pressure to an intermediate level, and a secondary regulator stage adapted to selectively provide communication between the first regulator stage and the pressure chamber for maintaining a desired gas pressure therein. The primary and secondary regulator stages include corresponding primary and secondary chambers which are interconnected by a passage formed in the housing. The pressurized gas from the gas pressure source is supplied to the primary chamber which is provided with a diaphragm-operated poppet valve to control the entry of the pressurized gas into the chamber. In addition, a diaphragm-controlled relief valve is provided to prevent excess pressure buildup in the primary chamber.

The secondary regulator stage includes an inlet member slidably mounted within the housing which extends from the secondary chamber through the central passage in the clamping piston to the pressure control chamber and sealing means located in the secondary chamber in a position to engage the inlet member to block gas flow into the pressure control chamber. The inlet member is responsive to the gas pressure in the pressure control chamber to move out of engagement with the sealing means when the pressure in the pressure control chamber drops below a predetermined level to supply pressurized gas thereto and to move into engagement with the sealing means when the gas pressure in the pressure control chamber increases to the predetermined level to block the gas flow into the pressure control chamber.

Preferably, the secondary regulator stage is provided with adjustable bias means to vary the pressure required in the pressure control chamber to move the inlet member into engagement with the sealing means. In addition, a pressure regulator piston is mounted on the inlet member and is provided with a central opening for gas flow from the inlet member into the pressure control chamber. The diaphragm is disposed across the central opening in the pressure regulator piston and adapted to function as a check valve to permit forward flow of pressurized gas from the inlet member into the pressure control chamber and to block reverse flow. The pressure regulator piston is disposed within the central passage of the clamping piston and both pistons are spaced apart to provide an annular space therebetween into which the diaphragm is collapsible to release excess pressure from the pressure control chamber.

Accordingly, it is a primary object of the present invention to provide a pressure reducing regulator for use in systems operable by pressurized gas which safely and effectively achieves pressure reduction and regulation.

It is also an object of the invention to provide an improved safety pressure regulator which automatically allows excess pressure to escape to avoid catastrophic failure of a dispensing system.

Another object of the invention is to provide an improved pressure regulator which achieves pressure reduction in two stages, and automatically maintains a desired output pressure in the dispensing system.

It is another object of the invention to provide a pressure reducing regulator with enhanced safety features which minimize the possibility of malfunctions which result in catastrophic failures in the system.

It is a further object of the invention to provide a safety pressure reducing regulator which is purposely designed to require attention by experienced personnel to minimize the possibility of damage to the equipment and injury to inexperienced operators.

BRIEF DESCRIPTION OF THE DRAWING

The objects and advantages of the present invention will become more apparent upon reference to the following specification and accompanying drawing, wherein:

FIG. 1 is a schematic view illustrating a beverage dispensing system which employs a pressure reducing regulator constructed in accordance with the present invention in the gas supply line between a gas pressure source and a beverage container;

FIG. 2 is an enlarged longitudinal cross section of the pressure reducing regulator;

FIG. 3 is a cross section of the regulator taken along line 3—3 of FIG. 2; and

FIG. 4 is a longitudinal section, partially cut away, of the pressure reducing regulator illustrating the action of the flexible diaphragm disposed in its pressure control chamber which serves as a check valve and provides protection against over-pressurization.

DETAILED DESCRIPTION OF PREFERRED EMBODIMENT

Referring to FIG. 1, there is schematically illustrated a beverage container 10, e.g., a conventional beer keg, provided with an opening in its top wall 12 for receiving a keg adapter 14 which is semi-permanently installed in the keg. A normally closed opening 16 is formed in the side wall of the keg. A coupler unit 20 is connected to keg adapter 14 to form a keg tapping unit. For example, the type of keg tapping device disclosed in U.S. Pat. No. 3,422,488, which is assigned to the common assignee herewith, may be employed. Coupler unit 20 includes a gas inlet port 22 provided with a fitting adapted to receive the end of a gas supply line 24 which is connected to a gas pressure source 26, e.g., a bottle of carbon dioxide. Coupler unit 20 also includes a fitting 28 adapted to receive the end of a flexible hose 30 through which the beverage is conveyed from vessel 10 to a conventional faucet 32. A pressure reducing regulator, generally 40, is disposed in gas supply line 24 which receives pressurized gas from source 26 and supplies a reduced gas pressure to the interior of vessel 10. The pressurized gas in the vessel drives the beverage outwardly through the tapping device and beverage supply line 30 for dispensing from faucet 32.

As shown in FIG. 2, pressure regulator 40 includes a regulator housing comprising a pressure inlet section 42 and a pressure outlet section 44. The outlet section of the regulator housing is generally cylindrical and hollow in configuration and provided with a set of exhaust vents 46. An outlet fitting 48 including an outwardly projecting nipple 50 provided with an axial passage 52 is received within cylindrical housing section 44 and held in place by a retainer ring 54 which is snap fit into a corresponding annular groove provided in the housing. A pair of O-ring seals 56 is mounted in a peripheral groove provided in outlet fitting 48 to provide a gas-tight seal between the outlet fitting and the interior wall of the housing. An inwardly projecting annular flange 58 is provided on outlet fitting 48 which defines a pressure control chamber 60 in communication with outlet passage 52.

A flexible diaphragm 62, preferably consisting of soft, elastomeric material, is disposed transversely within housing section 44 adjacent to annular flange 58 of the outlet fitting. Diaphragm 62 is circular in configuration and normally disposed across pressure control chamber 60 to seal the pressure control chamber from communication with exhaust vents 46. A cylindrically shaped clamping piston 64 is slidably disposed within housing section 44 and is normally biased by a compression spring 66 into engagement with the periphery of flexible diaphragm 62 to clamp the diaphragm against annular flange 58 in its normal position across pressure control chamber 60. A raised, annular ridge 68 is formed on the inner face of annular flange 58 to assist clamping piston 64 in firmly retaining flexible diaphragm 62 in place. Annular ridge 68 serves as a high pressure seal and firmly grips diaphragm 62 in response to the force exerted by compression spring 66. An O-ring seal 70 is mounted in a peripheral notch provided in clamping piston 64 to provide a gas-tight seal between the piston and regulator housing. Clamping piston 64 is hollow in configuration and provided with a central passage 72 in communication with exhaust vents 46.

Normally, clamping piston 64 under the action of compression spring 66 firmly clamps flexible diaphragm 62 across pressure control chamber 60 to block communication with exhaust vents 46. However, in the event of a malfunction which results in excess pressure buildup in pressure control chamber 60, a force is exerted on diaphragm 62 and transmitted to piston 64 which is sufficient to overcome the force of compression spring 66 and move the clamping piston backward to unclamp the diaphragm. The excess pressure initially acts on an annular portion of diaphragm 62 and piston 64 limited by ridge 68. However, once piston 64 is slightly moved, the excess pressure leaks across ridge 68 and acts on the entire piston face to rapidly disengage the piston from the diaphragm. Consequently, as shown in FIG. 2, a peripheral portion 74 of diaphragm 62 is allowed to collapse into central passage 72 to permit pressurized gas to escape from pressure control chamber 60 through exhaust vents 46. In the case of toxic or flammable gas, suitable conduits (not shown) may be connected to vents 46 to direct the gas to a safe disposal area. A pressure gauge 76 is threadably mounted in a flange 78 on housing section 44 in communication with pressure control chamber 60 to permit an operator to monitor the outlet pressure.

Pressure reducing regulator 40 includes a two-stage pressure reduction system for reducing the inlet pressure supplied from gas pressure source 26 to a desired pressure in pressure control chamber 60. As shown in FIG. 2, inlet section 42 of the regulator housing includes a threaded opening which is adapted to receive a threaded valve fitting 80 which, in turn, is adapted to threadably receive a fitting 82 for coupling the inlet gas pressure hose to the regulator. Inlet section 42 of the regulator housing and valve fitting 80 include interior, hollow portions which define a primary inlet chamber 84 for receiving pressurized gas from the source. A flexible diaphragm 86 is clamped between inlet housing section 42 and adapter fitting 80 and extends across primary inlet chamber 84. Diaphragm 86 includes an enlarged peripheral rim 88 which is anchored in a corresponding groove provided in the face of adapter fitting 80. A valve seat member 90 is secured to flexible diaphragm 86 and extends through a central opening provided in the diagragm. The valve seat member includes a central bore 92 which provides communication between the portions of primary inlet chamber 84 which are separated by diaphragm 86. A compression spring 94 is mounted in a recess provided in inlet housing section 42 for biasing valve seat member 90 into engagement with a stem 96 on a poppet valve member 98 which is located within a valve chamber 100 provided by suitable hollow openings formed in valve fitting 80 and inlet fitting 82. A compression spring 102 is located within valve chamber 100 to normally bias poppet valve member 98 downward with its stem 96 engaged with valve seat member 90 to close valve opening 92. Valve stem 96 extends through a restricted central opening 104 formed in valve fitting 80 which provides communication between chambers 84 and 100. Opening 104 includes an outwardly flared portion 105 to facilitate gas flow into chamber 84.

Poppet valve 98 is adapted to engage a tapered valve seat 106 formed on valve fitting 80 at the lower end of valve chamber 100 to control the entry of pressurized gas into primary inlet chamber 84. Inlet fitting 82 includes an axial passage 108 through which pressurized gas is supplied to valve chamber 100. A filter 110 is mounted within axial passage 108 for eliminating undesired particles or other contamination from the pressurized gas supplied by the gas pressure source.

In the primary regulator stage, compression springs 94 and 102 are designed to provide a force balanced system in which the combined action of the springs serve to normally maintain valve stem 96 engaged with valve seat member 90 to close valve opening 92 and to lift poppet valve member 98 out of engagement with valve seat 106 to allow pressurized gas to flow from valve chamber 100 through restricted passage 104 into primary inlet chamber 84.

When the gas pressure in chamber 84 reaches a predetermined level, e.g., 110 psi, diaphragm 86 and valve seat member 90 are moved against the bias of compression spring 94 to allow poppet valve 98 to engage valve seat 106 to block entry of pressurized gas into the chamber. Normally, when the gas pressure drops below the predetermined level, poppet valve 98 is opened to resume the flow of pressurized gas into chamber 84. However, in the event of an excess pressure buildup in the outer portion of primary inlet chamber 84, diaphragm 86 and valve seat member 90 are moved against the bias of compression spring 94 to separate the valve seat member from valve stem 96 with poppet valve 98 in engagement with valve seat 106. As a result, valve opening 92 is uncovered to allow pressurized gas from the outer portion of primary inlet chamber 85 to escape through vent(s) 114. Simultaneously, poppet valve 98 closes passage 104 to preclude further supply of pressurized gas from valve chamber 100 into primary inlet chamber 84. When the pressure in the primary inlet chamber drops to its desired level, compression spring 94 returns valve seat member 90 into engagement with valve stem 96 and lifts poppet valve 98 out of engagement with valve seat 106 to permit the flow of pressurized gas into the primary inlet chamber to be resumed.

Pressure reducing regulator 40 also includes a secondary regulator stage located in a secondary inlet chamber 120 formed by a longitudinal bore provided in inlet housing section 42. Pressurized gas is supplied to secondary inlet chamber 120 via a passageway 122 formed in housing section 42 which communicates with primary inlet chamber 84 via a passageway 124 and annular groove 126 formed in valve fitting 80.

A tubular inlet member 130 is slidably mounted in a hollow, cylindrical support member 132 which is threadably mounted in a threaded opening in the regulator housing which extends between secondary inlet chamber 120 and the hollow interior of outlet housing section 44. An O-ring seal 134 is located in a peripheral groove formed in cylindrical support member 132 to provide a gas-tight seal between the support member and regulator housing. In addition, O-ring seal 136 is located in an annular recess formed in support member 132 and held in place by a snap ring 138 to provide a gas-tight seal between the cylindrical support member and tubular inlet member 130. Preferably, cylindrical support member 132 includes a socket-like opening 140 which is adapted to receive a specially designed adjustment tool (not shown) to allow the axial position of the support member to be adjusted. A removable plug 142 is threadably received in inlet housing section 42 to seal secondary inlet chamber 120. Plug 142 includes a socket-like recess 144 which is adapted to receive a conventional hex wrench to permit removal of the plug when it is desired to adjust tubular support member 132. An elastomeric valve element 146 is mounted on the inner face of plug 142 for engagement with tubular inlet member 130 to block gas flow from secondary inlet chamber 120 into the inlet member.

At the opposite end of inlet member 130, a regulator piston 150 is mounted and provided with a central opening 152 which provides communication between the inlet member and pressure control chamber 60. A compression spring 154 is disposed between regulator piston 150 and a spring adjusting disc 156 rotatably supported on cylindrical support member 132. By adjustment of the position of support member 132 in the regulator housing, the position of spring adjusting disc 156 can be varied to adjust the bias exerted by compression spring 154 on regulator piston 150. The regulator piston is provided with a set of three forwardly projecting posts 158 arranged in a circular configuration on the piston face which are movable into engagement with the inner face of outlet fitting 148 to limit the extent of movement available to regulator piston 150 and inlet member 130.

Referring to FIG. 2, flexible diaphragm 62 is normally disposed across central opening 152 in regulator piston 150 to block the flow of pressurized gas from inlet member 130 into pressure control chamber 60. Preferably, the flexible diaphragm is adapted to function as a check valve to permit forward flow of pressurized gas from the inlet member into the pressure control chamber and to block reverse flow. As shown in FIG. 3, diaphragm 62 includes a set of six holes 160 which are arranged in a circular configuration and extend through the diaphragm. Three of the holes receive posts 158 and serve to retain the diaphragm in a desired position across the face of regulator piston 150. The remaining holes function as valve openings which selectively permit the pressurized gas to flow into the pressure control chamber.

The secondary regulator stage operates as follows. With the gas pressure in pressure control chamber 60 at or above its desired level, the force exerted on regulator piston 150 is sufficient to overcome the bias of compression spring 154 to hold inlet member 130 against elastomeric sealing element 146 to preclude the entry of pressurized gas from secondary inlet chamber 120 into the inlet member. In addition, flexible diaphragm 62 is pressed against the front face of regulator piston 150 to preclude any movement of gas or liquid through valve openings 160 in the diaphragm. When the gas pressure in pressure control chamber 60 drops below the desired level, regulator piston 150 and tubular inlet member 130 move forwardly under the action of compression spring 154 to disengage the inlet member from its elastomeric sealing element 146 to permit the pressurized gas in secondary inlet chamber 120 to flow into the inlet member. As shown in FIG. 4, the pressurized gas forces the central portion of diaphragm 62 to bulge outwardly from the face of regulator piston 150 to allow the pressurized gas to flow through valve openings 160 into the pressure control chamber. When the pressure in chamber 60 increases to the desired level, regulator piston 150 is moved backward against the action of compression spring 154 to return inlet member 130 into engagement with elastomeric seal element 146 to block the entry of pressurized gas into the inlet member. In addition, diaphragm 62 is pressed into engagement with the face of regulator piston 150 to close valve openings 160.

In summary, the primary regulator stage functions to reduce the inlet pressure from the gas pressure source to an intermediate level in primary inlet chamber 84 which is supplied to secondary inlet chamber 120. The secondary regulator stage functions to automatically supply pressurized gas from secondary inlet chamber 120 to pressure control chamber 60 to maintain a desired output pressure in the pressure control chamber. In the event of an excess pressure buildup in pressure control chamber 60 to a predetermined level, flexible diaphragm 62 is collapsed to allow the pressurized gas to escape through exhaust vents 46. Once diaphragm 62 is collapsed, it is necessary for experienced personnel to disassemble the regulator to reset or replace the diaphragm. This requirement provides a significant safeguard because it precludes the possibility of any catastrophic failure as a result of attempts by inexperienced operators to reset the pressure regulator.

Furthermore, the primary and secondary regulator stages are advantageously designed to minimize the possibility of catastrophic failure. The complete failure of either regulator stage cannot result in an unsafe situation, unless the failures occur simultaneously and with the secondary regulator stage failed in its fully open position. This circumstance is extremely unlikely simply because of the laws of probability. Since each regulator stage has a theoretical life of billions of cycles and years of time, the possibility of simultaneous failure is extremely remote.

In addition, the pressure regulator is designed to automatically shut down the dispensing system in the event of sequential failures of the regulator stages. For example, if the primary regulator stage fails, exposing the secondary regulator stage to high pressure, the secondary regulator stage will automatically close when the gas pressure in pressure control chamber 60 is at or above its desired level. On the other hand, if the secondary regulator stage fails in its open condition so that the high gas pressure from the primary regulator stage is continuously supplied to pressure control chamber 60, flexible diaphragm 62 is unclamped to release the remaining gas pressure from the source to the atmosphere. Moreover, the exposure of the secondary regulator stage to high pressure freezes tubular inlet member 130 closed to preclude further pressure buildup. Further, if the primary regulator stage fails in its closed condition, i.e., with poppet valve 98 closed, the poppet valve shuts off the source pressure supplied to the pressure regulator. If the primary regulator stage fails in its open condition, the pressurized gas is allowed to escape through vents 114 to preclude excessive pressure buildup.

In conclusion, the present invention provides a pressure reducing regulator which operates safely and effectively to reduce the input pressure from a pressurized gas source to an output pressure at a desired level and automatically maintains the desired output pressure in a dispensing system. The pressure regulator is advantageously designed to accomplish the pressure reduction in two stages which incorporate multiple safety features to minimize the possibility of failure. In addition, the pressure regulator is designed to automatically release the pressurized gas to the atmosphere in the event of excessive pressure buildup to preclude catastrophic failures.

The invention may be embodied in other specific forms without departing from the spirit or essential characteristics thereof. The present embodiment is therefore to be considered in all respects of illustrative and not restrictive, the scope of the invention being indicated by the appended claims rather than by the foregoing description, and all changes which come within the meaning and the range of equivalency of the claims are therefore intended to be embraced therein.

We claim:

1. A pressure regulator for disposition between a gas pressure source and a pressure vessel, said pressure regulator being characterized by having a pressure chamber normally sealed by a reusable diaphragm which is collapsible under abnormally high pressure conditions within the pressure chamber and which, for reasons of safety, is only manually, but, resetable, said pressure regulator comprising:

a housing provided with a pressure chamber therein and one or more vents to release excess pressure from said pressure chamber;

inlet means for supplying pressurized gas from said gas pressure source to said pressure chamber;

outlet means in communication with said pressure chamber for supplying the pressurized gas to said pressure vessel;

a flexible diaphragm disposed within said housing for normally sealing said pressure chamber from communication with said vents; and clamping mean disposed with said housing and adapted in a first position to normally clamp said diaphragm across said pressure chamber to block communication with said vents, said clamping means being actuatable in response to excess pressure in said pressure chamber to move to a second position to unclamp said diaphragm and allow said diaphragm to collapse and permit gas to escape from said pressure chamber through said vents, said clamping means being returnable substantially to said first position, upon said pressure chamber reaching atmospheric pressure, said diaphragm remaining in a collapsed configuration.

2. The pressure regulator of claim 1, wherein:
said clamping means is adapted to engage said flexible diaphragm at its periphery to clamp said diaphragm across said pressure chamber.

3. The pressure regulator of claim 1, wherein said clamping means includes:
a piston slidably mounted within said housing and adapted to engage the peripery of said flexible diaphragm.

4. The pressure regulator of claim 3, wherein said clamping means includes:
bias means for normally urging said piston into engagement with the periphery of said diaphragm, said piston being movable away from said diaphragm in response to excess pressure in said pressure chamber to unclamp its periphery and allow said diaphragm to collapse.

5. The pressure regulator of claim 3, wherein:
said piston includes a central passage to provide communication between said pressure chamber and said vents.

6. The pressure regulator of claim 5, wherein:
said flexible diaphragm is normally disposed across said central passage to block communication between said pressure chamber and said vents.

7. The pressure regulator of claim 1, wherein said inlet means includes:
a primary regulator stage for receiving pressurized gas from said source and reducing the gass pressure to an intermediate level; and
a secondary regulator stage in communication with said first regulator stage and said pressure chamber for maintaining a desired pressure in said pressure chamber.

8. The pressure regulator of claim 7, wherein:
said secondary regulator stage is adjustable to selectively vary the outlet pressure in said pressure chamber.

9. A pressure regulator for disposition between a gas pressure source and a pressure vessel, said pressure regulator being characterized by having a pressure chamber normally sealed by a reusable diaphragm which is collapsible under abnormally high pressure conditions within the pressure chamber and which, for reasons of safety is only manually resetable, said pressure regulator comprising:
a housing provided with a pressure control chamber therein and one or more vents to release excess pressure from said pressure control chamber;
inlet means for supplying pressurized gas from said gas pressure source to said pressure control chamber;

outlet means in communication with said pressure control chamber for supplying the pressurized gas to said pressure vessel;

a flexible diaphragm disposed within said housing for normally sealing said pressure control chamber from communication with said vents;

a clamping piston slidably disposed within said housing for movement between a first position and a second position and provided with a central passage in communication with said vents, said piston being normally adapted at said first position to clamp said diaphragm at its periphery and retain said diaphragm in place over said passage to preclude gas flow therethrough; and bias means for normally urging said piston into clamping engagement with said diaphragm, said piston being movable against the action of said bias means upon an increase of the gas pressure in said pressure control chamber above a predetermined level to unclamp said diaphragm and allow said diaphragm to collapse into said central passage to permit the gas to escape from said pressure control chamber through said vents.

10. The pressure regulator of claim 9, wherein said inlet means includes:
a primary regulator stage for receiving pressurized gas from said source and reducing the gas pressure to an intermediate level; and
a secondary regulator stage adapted to selectively provide communication between said first regulator stage and said pressure control chamber for maintaining a desired gas pressure therein.

11. The pressure regulator of claim 10, wherein:
said second regulator stage is adjustable to selectively vary the outlet pressure in said pressure control chamber.

12. The pressure regulator of claim 10, wherein said primary regulator stage comprises:
a primary inlet chamber formed in said housing for receiving pressurized gas from said source;
inlet valve means for controlling the entry of pressurized gas into said primary inlet chamber; and
diaphragm means disposed across said primary inlet chamber and responsive to the gas pressure therein for controlling the opening and closing of said inlet valve means to maintain a desired pressure in said primary inlet chamber.

13. The pressure regulator of claim 12, wherein said primary regulator stage includes:
relief valve means operatively coupled to said diaphragm means and ressponsive to the pressure in said primary inlet chamber to preclude excess pressure buildup therein.

14. The pressure regulator of claim 13, wherein said inlet valve means comprises:
a poppet valve operable by said diaphragm means to control the flow of pressurized gas into said primary inlet chamber.

15. The pressure regulator of claim 14, wherein said relief valve means includes:
a valve seat member mounted on said diaphragm means and provided with a valve opening extending therethrough;
a valve stem extending from said poppet valve into engagement with said valve seat member to normally block said valve opening, said valve seat member being movable out of engagement with said valve stem in response to excess pressure in said primary inlet chamber on said diaphragm means to unblock said valve opening; and vent means provided in said housing to allow pressurized gas to escape from said primary inlet chamber when said valve opening is unblocked.

16. A fluid dispensing system comprising: a pressure vessel containing the fluid to be dispensed; a gas pressure source for supplying gas to said pressure vessel; and a pressure regulator for disposition between a gas pressure source and a pressure vessel and regulating the flow of gas from said gas pressure source to said pressure vessel, said pressure regulator being characterized by having a pressure chamber normally sealed by a reusable diaphragm which is collapsible under abnormally high pressure conditions within the pressure chamber and which, for reasons of safety, is only manually, resetable, said pressure regulator including:

a housing provided with a pressure chamber therein and at least one vent to release excess pressure from said pressure chamber;

inlet means for supplying pressurized gas from said gas pressure source to said pressure chamber;

outlet means in communication with said pressure chamber for supplying the pressurized gas to said pressure vessel;

a resuable flexible diaphragm disposed within said housing for normally sealing said pressure chamber from communication with said vent; and clamping means disposed within said housing and adapted in a first position to normally clamp said diaphragm across said pressure chamber to block communication with said vent, said clamping means being actuatable in response to excess pressure in said pressure chamber to move to a second position to unclamp said diaphragm and allow said diaphragm to collapse and permit gas to escape from said pressure chamber through said vent said clamping means being returnable substantially to said first position upon said pressure chamber reaching atmosphere pressure, said diaphragm remaining in a collapsed configuration.

17. The dispensing system of claim 16, wherein:
said clamping means is adapted to engage said flexible diaphragm at its peripery to clamp said diaphragm across said pressure chamber.

18. The dispensing system of claim 16, wherein said clamping means includes:
a piston slidable mounted within said housing and adapted to engage the periphery of said flexible diaphragm.

19. The dispensing system of claim 18, wherein said clamping means includes:
bias means for normally urging said piston into engagement with the periphery of said diaphragm, said piston being movable away from said diaphragm in response to excess pressure in said pressure chamber to unclamp its periphery and allow said diaphragm to collapse.

20. The dispensing system of claim 18, wherein:
said piston includes a central passage to provide communication between said pressure chamber and said vent.

21. The dispensing system of claim 20, wherein:
said flexible diaphragm is normally disposed across said central passage to block communication between said pressure chamber and said vent.

22. The dispensing system of claim 20, wherein said inlet means includes:

a hollow inlet member extending through said central passage of said piston into communication with said pressure chamber.

23. The dispensing system of claim 22, wherein:
said flexible diaphragm is normally disposed across said inlet member and adapted to function as a check valve to permit forward flow of pressurized gas from said inlet member into said pressure chamber and to block reverse flow.

24. The dispensing system of claim 16, wherein said inlet means includes:

a primary regulator stage for receiving pressurized gas from said source and reducing the gas pressure to an intermediate level; and a secondary regulator stage in communication with said first regulator stage and said pressure chamber for maintaining a desired pressure in said pressure chamber.

25. The dispensing system of claim 24, wherein:
said secondary regulator stage is adjustable to selectively vary the outlet pressure in said pressure chamber.

26. A pressure regulator for disposition between a gas pressure source and a pressure vessel, comprising:

a housing provided with a pressure chamber therein and one or more vents to release excess pressure from said pressure chamber;

inlet means for supplying pressurized gas from said gas pressure source to said pressure chamber;

outlet means in communication with said pressure chamber for supplying the pressurized gas to said pressure vessel;

a flexible diaphragm disposed within said housing for normally sealing said pressure chamber from communication with said vents; and clamping means disposed within said housing and adapted to normally clamp said diaphragm across said pressure chamber to block communication with said vents, said clamping means being actuatable in response to excess pressure in said pressure chamber to unclamp said diaphragm and allow said diaphragm to collapse and permit gas to escape from said pressure chamber through said vents, said clamping means including a piston slidably mounted within said housing and adapted to engage the periphery of said flexible diaphragm, said piston including a central passage to provide communication between said pressure chamber and said vents, and said flexible diaphragm being normally disposed across said central passage to block communication between said pressure chamber and said vents with the periphery thereof being collapsible into said central passage when unclamped by said piston.

27. A pressure regulator for disposition between a gas pressure source and a pressure vessel, comprising:

a housing provided with a pressure chamber therein and one or more vents to release excess pressure from said pressure chamber;

inlet means for supplying pressurized gas from said gas pressure source to said pressure chamber, said inlet means including a hollow inlet member extending through said central passage of said piston into communication with said pressure chamber;

outlet means in communication with said pressure chamber for supplying the pressurized gas to said pressure vessel;

a flexible diaphragm disposed within said housing for normally sealing said pressure chamber from communication with said vents; and clamping means disposed within said housing and adapted to normally clamp said diaphragm across said pressure chamber to block communication with said vents, said clamping means being actuatable in response to excess pressure in said pressure chamber to unclamp said diaphragm and allow said diaphragm to collapse and permit gas to escape from said pressure chamber through said vents, said clamping means including a piston slidably mounted within said housing and adapted to engage the periphery of said flexible diaphragm, said piston including a central passage to provide communication between said chamber and said vents.

28. The pressure regulator of claim 27, wherein: said flexible diaphragm is normally disposed across said inlet member and adapted to function as a check valve to permit forward flow of pressurized gas from said inlet member into said pressure chamber and to block reverse flow.

29. A pressure regulator for disposition between a gas pressure source and a pressure vessel, comprising:

a housing provided with a pressure control chamber therein and one or more vents to release excess pressure from said pressure control chamber;

inlet means for supplying pressurized gas from said gas pressure source to said pressure control chamber, said inlet means including:
 a primary regulator stage for receiving pressurized gas from said source and reducing the gas pressure to an intermediate level; and
 a secondary regulator stage adapted to selectively provide communication between said first regulator stage and said pressure control chamber for maintaining a desired gas pressure therein, said secondary regulator stage comprising:
  a secondary inlet chamber formed in said housing;
  a tubular inlet member slidably mounted within said housing and extending from said secondary inlet chamber through said central passage in said clamping piston to said pressure control chamber; and
  sealing means located in said secondary chamber in a position to engage said inlet member to block gas flow into said pressure control chamber, said inlet member being responsive to the gas pressure in said pressure control chamber to move out of engagement with said sealing means when the pressure in said pressure control chamber drops below a predetermined level to supply pressurized gas thereto and to move into engagement with said sealing means when the gas pressure in said pressure control chamber increases to the predetermined level to block the gas flow into said pressure control chamber;

outlet means in communication with said pressure control chamber for supplying the pressurized gas to said pressure vessel;

a flexible diaphragm disposed within said housing for normally sealing said pressure control chamber from communication with said vents;

a clamping piston slidably disposed within said housing and provided with a central passage in communication with said vents, said piston being adapted to clamp said diaphragm at its periphery and retain said diaphragm in place over said passage to preclude gas flow therethrough; and bias means for normally urging said piston into clamping engagement with said diaphragm, said piston being movable against the action of said bias means upon an increase of the gas pressure in said pressure control chamber above a predetermined level to unclamp said diaphragm and allow said diaphragm to collapse into said central passage to permit the gas to escape from said pressure control chamber through said vents.

30. The pressure regulator of claim 29, which includes:

a regulator piston mounted on said inlet member and provided with a central opening for gas flow from said inlet member into said pressure control chamber; and said diaphragm being disposed across said central opening in said regulator piston and adapted to function as a check valve to permit forward flow of pressurized gas from said inlet member into said pressure control chamber and to block reverse flow.

31. The pressure regulator of claim 30, wherein: said second regulator stage is adjustable to selectively vary the outlet pressure in said pressure control chamber.

32. The pressure regulator of claim 30, wherein: said regulator piston is disposed within said central passage of said clamping piston, said pistons being spaced apart to provide an annular space therebetween into which said diaphragm is collapsible to release excess pressure from said pressure control chamber.

33. The pressure regulator of claim 30, wherein:

said pressure control piston includes one or more posts projecting perpendicularly therefrom into said pressure control chamber; and said diaphragm includes one or more openings for receiving said posts to mount said diaphragm thereon and one or more valve openings to control the gas flow from said inlet member into said pressure control chamber.

34. The pressure regulator of claim 33, wherein:

said posts on said pressure control piston serve as stop members to limit the extent of movement available to said inlet member.

35. A fluid dispensing system comprising: a pressure vessel containing the fluid to be dispensed; a gas pressure source for supplying gas to said pressure vessel; and a pressure regulator for disposition between a gas pressure source and a pressure vessel and regulating the flow of gas from said gas pressure source to said pressure vessel, said pressure regulator including:

a housing provided with a pressure chamber therein and at least one vent to release excess pressure from said pressure chamber;

inlet means for supplying pressurized gas from said gas pressure source to said pressure chamber;

outlet means in communication with said pressure chamber for supplying the pressurized gas to said pressure vessel;

a flexible diaphragm disposed within said housing for normally sealing said pressure chamber from communication with said vent; and clamping means disposed within said housing and adapted to normally clamp said diaphragm across said pressure chamber to block communication with said vent, said clamping means being actuatable in response to excess pressure in said pressure chamber to unclamp said diaphragm and allow said diaphragm to collapse and permit gas to escape from said pressure chamber through said vent, said clamping means including a piston slidably mounted within said housing and adapted to engage the periphery of said flexible diaphragm, said piston including a central passage to provide communication between said pressure chamber and said vent, and said flexible diaphragm being normally disposed across said central passage to block communication between said pressure chamber and said vent with the periphery of said flexible diaphragm being collapsible into said central passage when unclamped by said piston.

* * * * *